(12) United States Patent
Chung

(10) Patent No.: US 10,475,197 B2
(45) Date of Patent: Nov. 12, 2019

(54) IMAGE PROCESSING METHOD, IMAGE PROCESSING DEVICE AND COMPUTER READABLE STORAGE MEDIUM

(71) Applicant: Wistron Corporation, New Taipei (TW)

(72) Inventor: Tai Chung, New Taipei (TW)

(73) Assignee: Wistron Corporation, New Taipei (TW)

( * ) Notice: Subject to any disclaimer, the term of this patent is extended or adjusted under 35 U.S.C. 154(b) by 94 days.

(21) Appl. No.: 15/853,930

(22) Filed: Dec. 25, 2017

(65) Prior Publication Data

US 2019/0102895 A1 Apr. 4, 2019

(30) Foreign Application Priority Data

Oct. 2, 2017 (TW) .............................. 106134066 A

(51) Int. Cl.
| | |
|---|---|
| *G06T 7/536* | (2017.01) |
| *G06T 7/593* | (2017.01) |
| *G06T 7/11* | (2017.01) |
| *G06T 7/194* | (2017.01) |
| *G06T 7/543* | (2017.01) |
| *G06K 9/62* | (2006.01) |

(52) U.S. Cl.
CPC ............ *G06T 7/543* (2017.01); *G06K 9/6202* (2013.01); *G06T 7/11* (2017.01); *G06T 7/194* (2017.01); *G06T 7/536* (2017.01); *G06T 7/593* (2017.01); *G06K 2009/6213* (2013.01); *G06T 2207/20068* (2013.01)

(58) Field of Classification Search
CPC ......... G06T 7/543; G06T 7/593; G06T 7/536; G06T 7/55; G06T 7/194; G06T 7/11; G06T 2207/20068; G06T 2207/10028; G06K 9/6202; G06K 2009/6213
See application file for complete search history.

(56) References Cited

U.S. PATENT DOCUMENTS

2011/0044502 A1\* 2/2011 Liu .......................... G06T 7/174
382/103
2017/0039856 A1\* 2/2017 Park ......................... B60R 1/00
(Continued)

FOREIGN PATENT DOCUMENTS

| | | | | |
|---|---|---|---|---|
| CN | 102780855 | 11/2012 | | |
| TW | I502166 | 10/2015 | | |
| WO | WO-2016044296 A1 \* | 3/2016 | ......... | A61N 1/36046 |

OTHER PUBLICATIONS

Song et al. "3D Mapping and Estimation from Moving Direction of Indoor Mobile Robot using Vanishing Points." ICCAS-SICE, Aug. 18, 2009, pp. 3504-3508 (Year: 2009).\*

(Continued)

*Primary Examiner* — Jon Chang
(74) *Attorney, Agent, or Firm* — JCIPRNET

(57) ABSTRACT

An image processing method, an image processing device, and a computer readable storage medium are provided. An original disparity image is obtained through an image capture device. A background correlation line is obtained in a mapping disparity map according to a background region corresponding to a target object. The background region is deleted in the original disparity image based on the background correlation line.

18 Claims, 6 Drawing Sheets

(56) References Cited

U.S. PATENT DOCUMENTS

2017/0344832 A1* 11/2017 Leung .................... G06T 7/292
2018/0009374 A1* 1/2018 Kim .................... G03B 21/206

OTHER PUBLICATIONS

Ivanov et al. "Fast Lighting Independent Background Subtraction." Proceedings IEEE Workshop on Visual Surveillance, Jan. 2, 1998, pp. 1-7 (Year: 1998).*

Farhad et al. "An Efficient Moving Object Detection and Distance Measurement Algorithm using Correlation Window." 9th International Forum on Strategic Technology, Oct. 21, 2014, pp. 48-51 (Year: 2014).*

Lee et al. "Feature-based Lateral Position Estimation of Surrounding Vehicles Using Stereo Vision." IEEE Intelligent Vehicles Symposium, Jun. 11, 2017, pp. 779-784 (Year: 2017).*

"Office Action of Taiwan Counterpart Application", dated Oct. 24, 2018, p. 1-p. 6.

\* cited by examiner

IMAGE PROCESSING METHOD, IMAGE PROCESSING DEVICE AND COMPUTER READABLE STORAGE MEDIUM

CROSS-REFERENCE TO RELATED APPLICATION

This application claims the priority benefit of Taiwan application serial no. 106134066, filed on Oct. 2, 2017. The entirety of the above-mentioned patent application is hereby incorporated by reference herein and made a part of this specification.

BACKGROUND OF THE INVENTION

Field of the Invention

The disclosure relates to an image processing mechanism, and in particular, to an image processing method, an image processing device, and a computer readable storage medium for recognizing a target object.

Description of Related Art

As one of the methods for obtaining a disparity map, the stereo vision image technique of dual lenses calculates depth information according to a disparity of feature points in left and right images, and, after obtaining the disparity map, defines interconnected image blocks in the disparity map as the same object. One of the encountered difficulties is that the floor is prone to interconnect different objects, causing multiple objects to be recognized as one single interconnected object.

Background deletion is a technique commonly used in image processing, but establishment of a background usually requires an image capture device to be fixed, and it takes time to collect a large number of images to establish a background model. Accordingly, how to quickly and precisely delete the floor in the image is currently one of the issues to research in the art of image processing.

SUMMARY OF THE INVENTION

The embodiments of the disclosure provide an image processing method, an image processing device, and a computer readable storage medium that delete a background region to enhance correctness in separating objects.

An image processing method for recognizing a target object according to an embodiment of the disclosure includes: obtaining an original disparity image through an image capture device; obtaining a background correlation line in a mapping disparity map according to a background region corresponding to a target object; and deleting the background region in the original disparity image based on the background correlation line.

In an embodiment of the disclosure, the step of obtaining the background correlation line in the mapping disparity map according to the background region corresponding to the target object includes: finding a background correlation line in the mapping disparity map. The step of deleting the background region in the original disparity image based on the background correlation line includes: obtaining an estimated background disparity map based on the background correlation line; and comparing the estimated background disparity map and the original disparity image, and deleting the background region in the original disparity image.

In an embodiment of the disclosure, the step of finding the background correlation line in the mapping disparity map includes: calculating an included angle between a field of view of a lens of the image capture device and a ground; calculating a nearest floor distance based on the included angle and an installation height of the image capture device; calculating a vanishing point position in the mapping disparity map based on a capture focal length of the image capture device and a pitch angle for the image capture device to capture images; calculating a nearest floor disparity value based on the capture focal length, a baseline distance, and the nearest floor distance of the image capture device; and obtaining a ground correlation line in the mapping disparity map based on the vanishing point position and the nearest floor disparity value, wherein the ground correlation line is the background correlation line.

In an embodiment of the disclosure, before calculating the included angle between the field of view of the lens of the image capture device and the ground, the field of view of the lens is calculated based on an image height and the capture focal length of the image capture device, wherein the field of view of the lens is calculated according to a formula below:

$$FOV = 2 \times \arctan[(D_{ImageHeight}/2)/F],$$

wherein FOV is the field of view of the lens, $D_{ImageHeight}$ is the image height, and F is the capture focal length.

In an embodiment of the disclosure, the included angle between the field of view of the lens of the image capture device and the ground is calculated according to a formula below:

$$\theta = FOV/2 + \theta_{PitchAngle},$$

wherein $\theta$ is the included angle between the field of view of the lens and the ground, and $\theta_{PitchAngle}$ is the pitch angle.

In an embodiment of the disclosure, the nearest floor distance is calculated according to a formula below:

$$D_{NearestPlane} = D_{CaptureHeight}/\sin(\theta),$$

wherein $D_{NearestPlane}$ is the nearest floor distance, and $D_{CaptureHeight}$ is the installation height.

In an embodiment of the disclosure, the vanishing point position in the mapping disparity map is calculated according to a formula below:

$$P_{Vanish} = F \times \tan(\theta_{PitchAngle}) + V_{Capturer},$$

wherein $P_{Vanish}$ is the vanishing point position in the mapping disparity map, and $V_{Capturer}$ is a vanishing point position in the case where the image capture device is in a horizontal state.

In an embodiment of the disclosure, the nearest floor disparity value is calculated according to a formula below:

$$V_{NearestDisparity} = D_{BaseLine} \times /D_{NearestPlane},$$

wherein $V_{NearestDisparity}$ is the nearest floor disparity value, and $D_{BaseLine}$ is the baseline distance.

In an embodiment of the disclosure, the step of obtaining the estimated floor disparity map based on the background correlation line includes: projecting the background correlation line to UV coordinates to obtain the estimated background disparity map.

In an embodiment of the disclosure, the step of comparing the estimated floor disparity map and the original disparity image and deleting the background region in the original disparity image includes: comparing each pixel of the original disparity image and each pixel of the estimated background disparity map one by one, and determining whether a disparity value of the original disparity image is greater than a disparity value of the estimated background disparity map; determining the pixels of which the disparity value of the original disparity image is smaller than or equal to the disparity value of the estimated background disparity map as the background region; and deleting the background region in the original disparity image.

In an embodiment of the disclosure, the image capture device includes two lenses.

In an embodiment of the disclosure, the mapping disparity map is a V-disparity map or a U-disparity map, and the background region is a floor region.

An image processing device according to an embodiment of the disclosure includes: an image capture device, obtaining an original disparity image; a storage device, storing a plurality of modules; and a processor coupled to the image capture device and the storage device, the processor receiving the original disparity image and driving the modules to execute a plurality of operations, the operations including: obtaining a background correlation line in a mapping disparity map according to a background region corresponding to a target object; and deleting the background region in the original disparity image based on the background correlation line.

A non-transitory computer readable storage medium according to an embodiment of the disclosure records at least one program command, wherein the program command executes the image processing method for recognizing a target object after being loaded to an electronic device.

In light of the above, in the embodiments of the disclosure, the background region corresponding to the target object is found such that the definition of the background region may be output to other disparity maps for use. When a disparity map uses the definition of the background region, the background region may be directly deleted in the map to prevent interconnection of objects due to the background and reduce a computational capability for separating and recognizing objects.

To provide a further understanding of the aforementioned and other features and advantages of the disclosure, exemplary embodiments, together with the reference drawings, are described in detail below.

DESCRIPTION OF THE EMBODIMENTS

Figure 1:
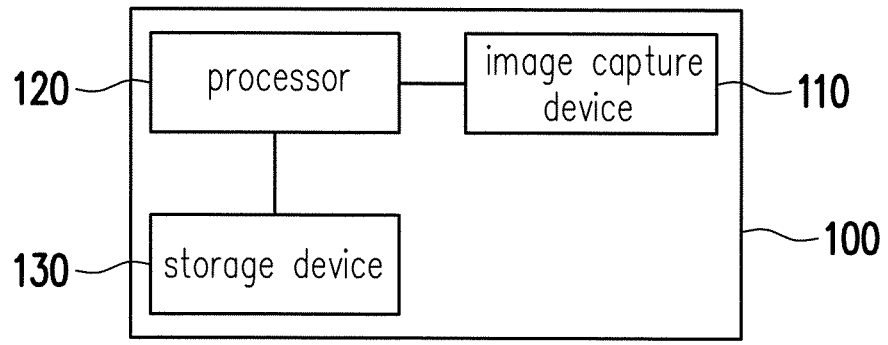
FIG. 1 is a block diagram illustrating an image processing device according to an embodiment of the disclosure.

FIG. 1 is a block diagram illustrating an image processing device according to an embodiment of the disclosure. Referring to FIG. 1, here, an image processing device 100 is an electronic device having computational capability, such as a laptop, a tablet computer, a digital camera, a smartphone, a smartwatch, a robot, etc. The image processing device 100 includes an image capture device 110, a processor 120, and a storage device 130. The processor 120 is coupled to the image capture device 110 and the storage device 130.

The image capture device 110 is, for example, a video camera, a camera, etc. having a charge coupled device (CCD) lens or a complementary metal oxide semiconductor (CMOS) transistor lens. Here, the image capture device 110 is, for example, a depth camera including two lenses, and an original disparity image is obtained by using the dual lenses.

The processor 120 is, for example, a central processing unit (CPU), a graphic processing unit (GPU), a physics processing unit (PPU), a programmable microprocessor, an embedded control chip, a digital signal processor (DSP), an application specific integrated circuit (ASIC), or another similar device.

The storage device 130 is, for example, a fixed or movable random access memory (RAM), read-only memory (ROM), flash memory, secure digital memory card (SD), hard disc of any form, another similar device, or a combination of these devices. The storage device 130 includes a plurality of modules, and the processor 120 drives these modules to realize a plurality of steps of an image processing method.

Moreover, the processor 120 and the storage device 130 may be installed in a host, and the host is coupled to the image capture device 110 through a connection interface to receive and analyze images captured by the image capture device 110.

The host is, for example, a desktop computer, a laptop, a tablet computer, a smartphone, a smartwatch, a cloud server, etc. The host is coupled to the image capture device 110 through a connection interface such as a wireless network interface, a wired network interface, or a Universal Serial Bus (USB).

The steps of the image processing method will be described below with reference to the image processing device 100 above.

Figure 2:
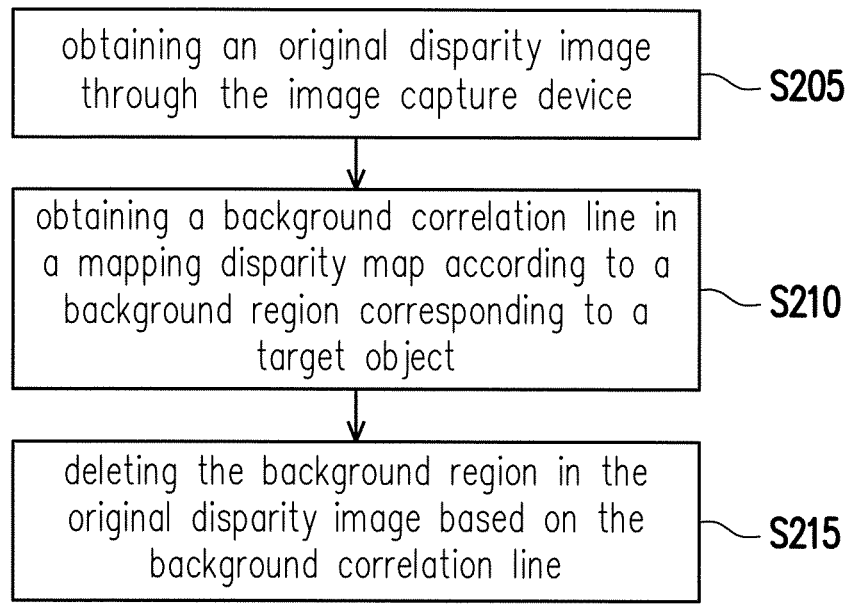
FIG. 2 is a flowchart illustrating an image processing method according to an embodiment of the disclosure.

FIG. 2 is a flowchart illustrating an image processing method according to an embodiment of the disclosure. Referring to both FIG. 1 and FIG. 2, in step S205, an original disparity image is obtained through the image capture device 110. Here, the original disparity image is a UV map using UVD coordinate space, wherein U refers to a horizontal position of the image, V refers to a vertical position of the image, and D refers to a disparity value stored in each pixel. For example, in a 1080p UV map, the U value is indicated by 1920 units on the horizontal axis, and the V value is indicated by 1080 units on the vertical axis.

Then, in step S210, a background correlation line is obtained in a mapping disparity map according to a background region corresponding to a target object. For example, where the background region is a floor region, to define a ground extending on a horizontal plane, the V value which is used to define a ground height and the D value which is used to define an extension direction are very important. Therefore, the mapping disparity map is a V-disparity map. In other words, the floor is defined by using the V-disparity map. However, in other embodiments, the mapping disparity map may also be a U-disparity map, which is not limited here.

For example, where the mapping disparity map is the V-disparity map and the background region is the floor region, a ground correlation line is found in the V-disparity map, and the ground correlation line is set as the background correlation line. Then, in step S215, the background region is deleted in the original disparity image based on the background correlation line to recognize the target object. Specifically, after the ground correlation line is obtained, an estimated floor disparity map (estimated background disparity map) is obtained based on the ground correlation line. Here, the ground correlation line is projected to UV coordinates to obtain the estimated floor disparity map. Afterwards, the estimated floor disparity map and the original disparity image are compared, and the floor region is deleted in the original disparity image to recognize the target object.

In the present embodiment, the ground correlation line is found by using a vanishing point and a nearest floor distance. The vanishing point refers a single point where all parallel straight lines vanish at infinity in a perspective view. The nearest floor distance refers to a nearest distance among floor distances that can be captured in a field of view (FOV) of the lens of the image capture device 110.

Figure 3:
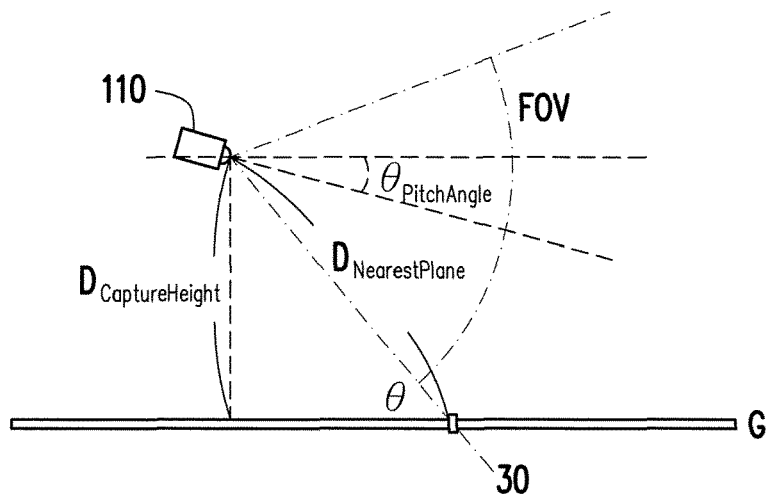
FIG. 3 is a schematic diagram illustrating an environment arrangement of an image capture device according to an embodiment of the disclosure.

For example, FIG. 3 is a schematic diagram illustrating an environment arrangement of an image capture device according to an embodiment of the disclosure. Referring to FIG. 3, a distance from the image capture device 110 to a ground G at a lower edge 30 of the field of view FOV of the lens of the image capture device 110 is the nearest floor distance $D_{NearestPlane}$. In the present embodiment, an installation height of the image capture device 110 from the ground G is $D_{CaptureHeight}$, θ is an included angle between the lower edge 30 of the field of view FOV of the lens and the ground G, and $θ_{PitchAngle}$ is a pitch angle for the image capture device 110 to capture images. Specifically, the pitch angle $θ_{PitchAngle}$ and the installation height $D_{CaptureHeight}$ are known values. For example, after setting up the image capture device 110, a user further measures the installation height $D_{CaptureHeight}$ and the pitch angle $θ_{PitchAngle}$.

Figure 4:
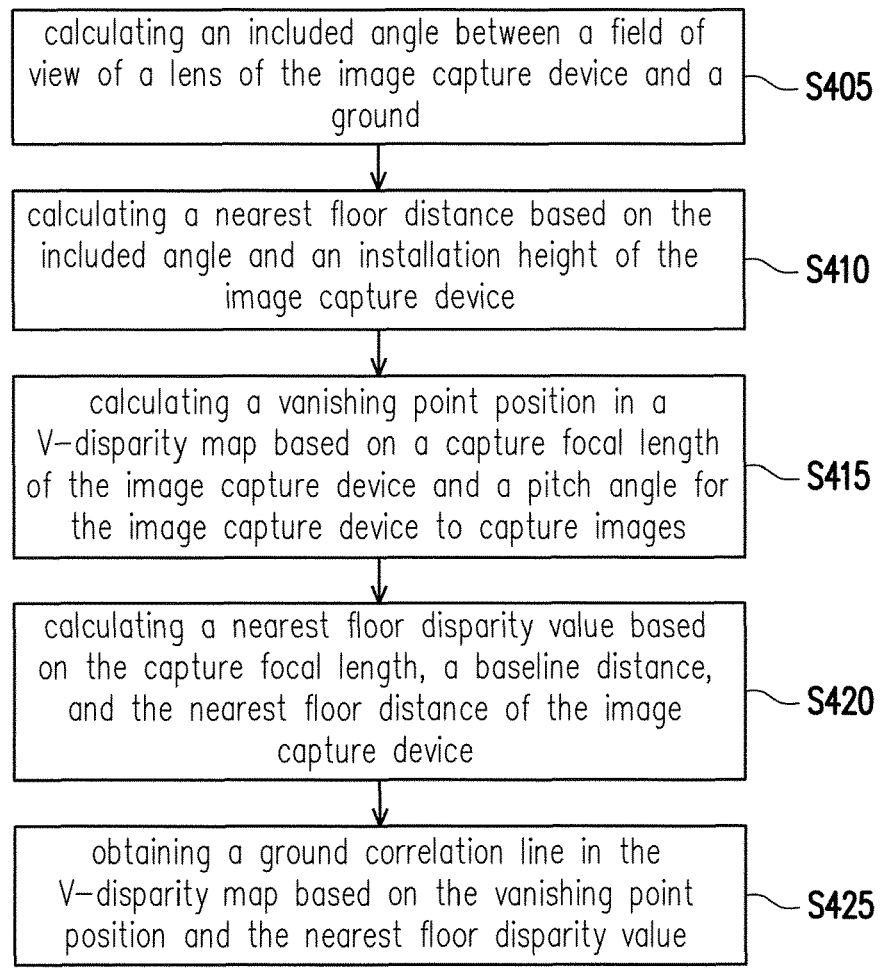
FIG. 4 is a flowchart illustrating a method of finding a ground correlation line according to an embodiment of the disclosure.

FIG. 4 is a flowchart illustrating a method of finding a ground correlation line according to an embodiment of the disclosure. Referring to FIG. 4, in step S405, the included angle θ between the field of view FOV of the lens of the image capture device 110 and the ground G is calculated. Here, the included angle θ between the field of view FOV of the lens and the ground G is calculated by using Formula 1 below.

$$θ=FOV/2+θ_{PitchAngle}$$ (Formula 1)

Before calculating the included angle θ, the processor 120 calculates the field of view FOV of the lens based on an image height $D_{ImageHeight}$ and a capture focal length F of the image capture device 110. The image height $D_{ImageHeight}$ is obtained based on a resolution of the image capture device 110. For example, the field of view FOV of the lens is obtained by using Formula 2.

$$FOV=2\times\arctan[(D_{ImageHeight}/2)/F]$$ (Formula 2)

In step S410, based on the included angle θ and the installation height $D_{CaptureHeight}$ of the image capture device 110, the nearest floor distance $D_{NearestPlane}$ is calculated, as shown in Formula 3 below.

$$D_{NearestPlane}=D_{CaptureHeight}/\sin(θ)$$ (Formula 3)

In step S415, based on the capture focal length F of the image capture device 110 and the pitch angle $θ_{PitchAngle}$ for the image capture device 110 to capture images, the vanishing point position $P_{Vanish}$ in the V-disparity map is calculated, as shown in Formula 4 below.

$$P_{Vanish}=F\times\tan(θ_{PitchAngle})+V_{Capturer}$$ (Formula 4)

Specifically, $V_{Capturer}$ is a vanishing point position in the case where the image capture device 110 is in a horizontal state. Taking the UV map as an example, when the lens is in a horizontal state, the vanishing point position $V_{Capturer}$ is located right at the center of the image. Therefore, the V value (i.e., a vertical position) of the vanishing point position $V_{Capturer}$ is $D_{ImageHeight}/2$. However, considering that the lens may not be in a horizontal state, the capture focal length F and the pitch angle $θ_{PitchAngle}$ are added to calculate the V value of the vanishing point position $V_{Capturer}$.

In step S420, based on the capture focal length F, a baseline distance $D_{BaseLine}$, and the nearest floor distance $D_{NearestPlane}$ of the image capture device 110, a nearest floor disparity value $V_{NearestDisparity}$ is calculated, as shown in Formula 5 below, wherein the baseline distance $D_{BaseLine}$ is a distance between the two lenses of the image capture device 110.

$$V_{NearestDisparity}=D_{BaseLine}\times F/D_{NearestPlane}$$ (Formula 5)

In step S425, in the V-disparity map, based on the vanishing point position $P_{Vanish}$ and the nearest floor disparity value $V_{NearestDisparity}$, the ground correlation line is obtained. Here, in the V-disparity map, a straight line formed by connecting the vanishing point position $P_{Vanish}$ and the nearest floor disparity value $V_{NearestDisparity}$ is used as the ground correlation line.

Figure 5:
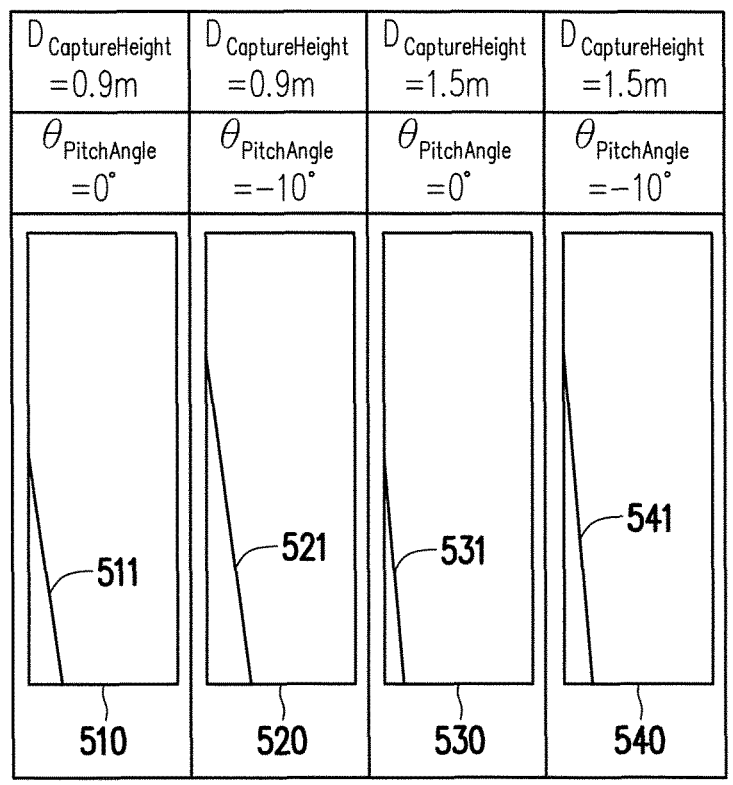
FIG. 5 is a schematic diagram illustrating V-disparity maps based on different installation heights and pitch angles according to an embodiment of the disclosure.

For example, FIG. 5 is a schematic diagram illustrating V-disparity maps based on different installation heights and pitch angles according to an embodiment of the disclosure. Referring to FIG. 5, in V-disparity maps 510, 520, 530, 540, the vertical axis represents a vertical height V, the horizontal axis represents a disparity value D, and the V-disparity maps 510, 520, 530, 540 respectively include ground correlation lines 511, 521, 531, 541.

Where the installation height $D_{CaptureHeight}$ of the image capture device 110 is 0.9 m and the pitch angle $θ_{PitchAngle}$ is 0 degree, the V-disparity map 510 is obtained.

Where the installation height $D_{CaptureHeight}$ of the image capture device 110 is 0.9 m and the pitch angle $θ_{PitchAngle}$ is −10 degrees (which means that the lens is vertically downward), the V-disparity map 520 is obtained. Where the installation height $D_{CaptureHeight}$ of the image capture device 110 is 1.5 m and the pitch angle $θ_{PitchAngle}$ is 0 degree, the V-disparity map 530 is obtained. Where the installation height $D_{CaptureHeight}$ of the image capture device 110 is 1.5 m and the pitch angle $θ_{PitchAngle}$ is −10 degrees, the V-disparity map 540 is obtained.

Figure 6:
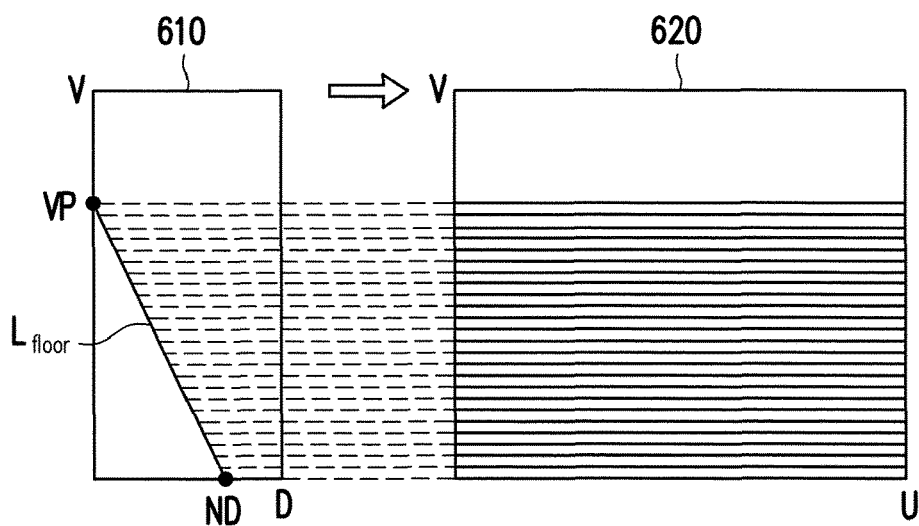
FIG. 6 is a schematic diagram illustrating projecting a ground correlation line as a UV map according to an embodiment of the disclosure.

FIG. 6 is a schematic diagram illustrating projecting a ground correlation line as a UV map according to an embodiment of the disclosure. Referring to FIG. 6, in a V-disparity map 610, the vertical axis represents the vertical position V, the horizontal axis represents the disparity value D, and a straight line connecting the vanishing point position VP and the nearest floor disparity value ND is a ground correlation line $L_{floor}$. In the UV map 620 (i.e., the estimated floor disparity map), the vertical axis represents the vertical position V, the horizontal axis represents the horizontal position U, and their coordinate value is the disparity value D.

A method of projecting the ground correlation line $L_{floor}$ of the V-disparity map 610 as the UV map 620 is: using the disparity value of the vertical position of the ground correlation line $L_{floor}$ as the coordinate value of all pixels of the corresponding vertical position in the UV map. For example, the disparity value (i.e., the nearest floor disparity value ND) of the vertical position of 0 is used as the coordinate value of all pixels of the vertical position of 0 in the UV map; the disparity value of the vertical position of 1 is used as the coordinate value of all pixels of the vertical position of 1 in the UV map; and the disparity value (0) of the vertical position of VP is used as the coordinate value of all pixels of the vertical position of VP in the UV map. Repeating the step above, the ground correlation line $L_{floor}$ is projected as the UV map 620.

In other words, in the UV map 620, the value of the pixels of all horizontal positions corresponding to the same vertical position is the same disparity value. In the UV map 620, the smaller the vertical position is, the greater the disparity is. Afterwards, the pixels in the UV map 620 are compared with the pixels in the original disparity image obtained in step S205 one by one to determine whether the disparity value of the original disparity image is greater than the disparity value of the UV map 620. The pixels of which the disparity value of the original disparity image is smaller than or equal to the disparity value of the UV map are determined to be the floor region. Moreover, the floor region is deleted in the original disparity image.

For example, in terms of the coordinates (x,y), the disparity values of two pixels of the coordinates (x,y) of the original disparity image and the coordinates (x,y) of the UV map 620 are respectively compared. If the disparity value of the coordinates (x,y) of the original disparity image is smaller than or equal to the disparity value of the coordinates (x,y) of the UV map 620, it means that the object of this pixel is at a distance greater than or equal to the ground. Therefore, the pixel is deleted in the original disparity image. If the disparity value of the coordinates (x,y) of the original disparity image is greater than the disparity value of the coordinates (x,y) of the UV map 620, it means that the object of this pixel is at a distance smaller than the ground, and the pixel is the object on the ground.

Figure 7A:
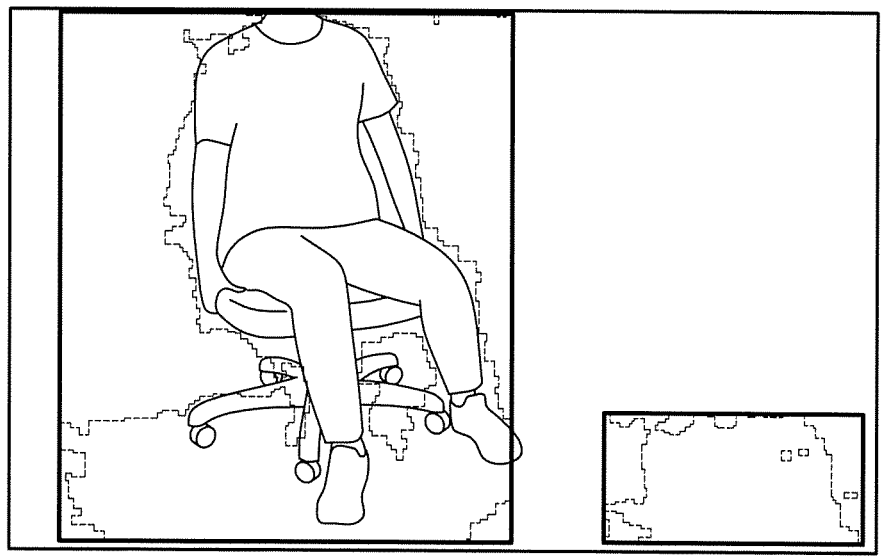
FIG. 7A is a schematic diagram illustrating an object frame selection result where a ground is not removed according to an embodiment of the disclosure.
Figure 7B:
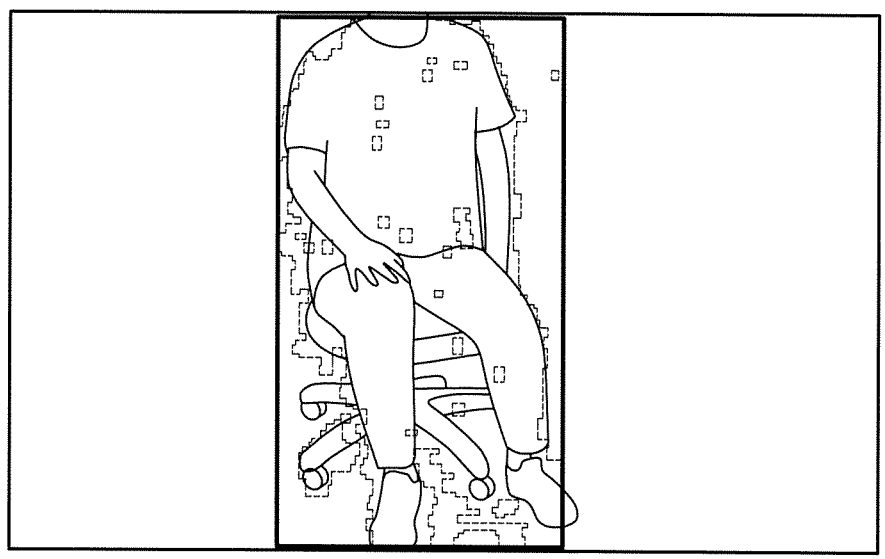
FIG. 7B is a schematic diagram illustrating an object frame selection result where the ground is removed according to an embodiment of the disclosure.
Figure 8A:
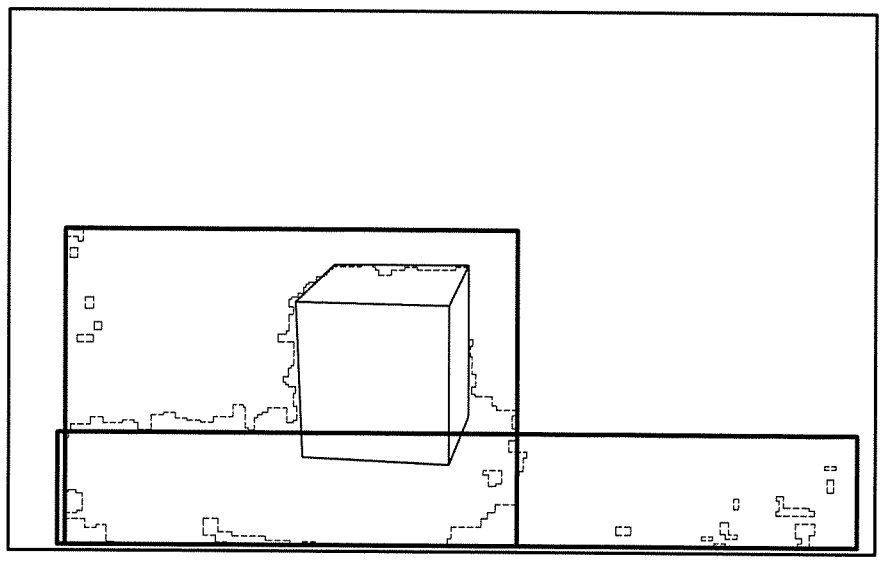
FIG. 8A is a schematic diagram illustrating an object frame selection result where the ground is not removed according to another embodiment of the disclosure.
Figure 8B:
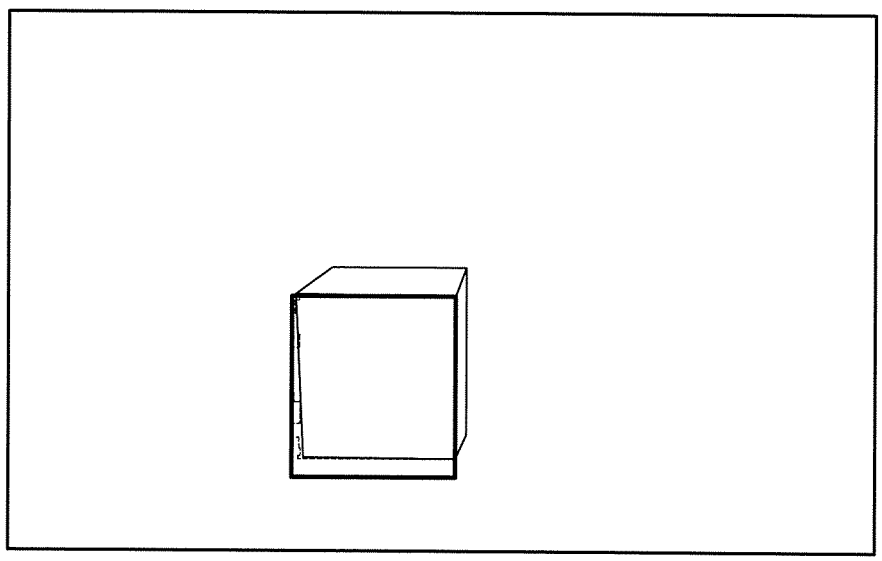
FIG. 8B is a schematic diagram illustrating an object frame selection result where the ground is removed according to another embodiment of the disclosure.
Figure 9A:
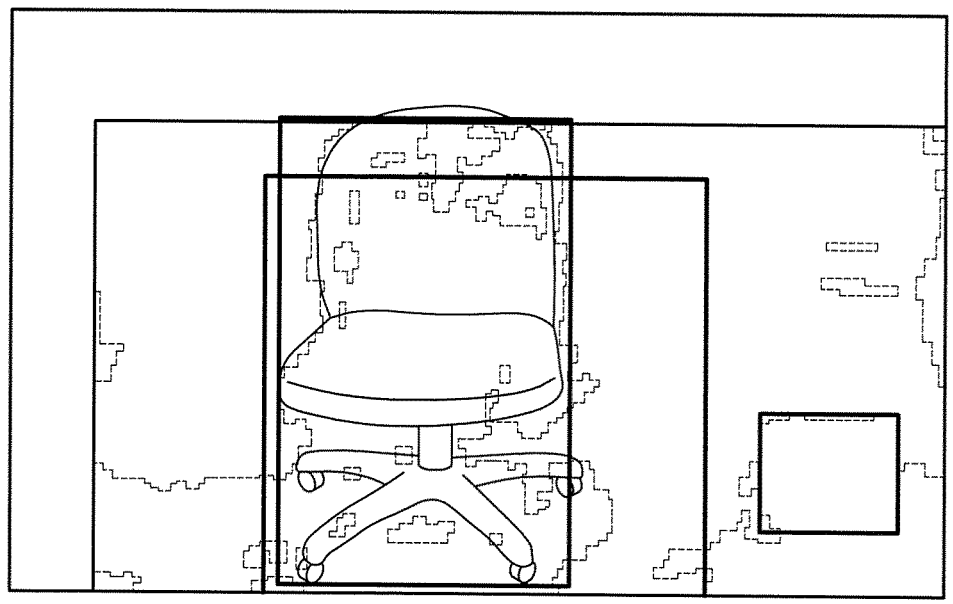
FIG. 9A is a schematic diagram illustrating an object frame selection result where the ground is not removed according to another embodiment of the disclosure.
Figure 9B:
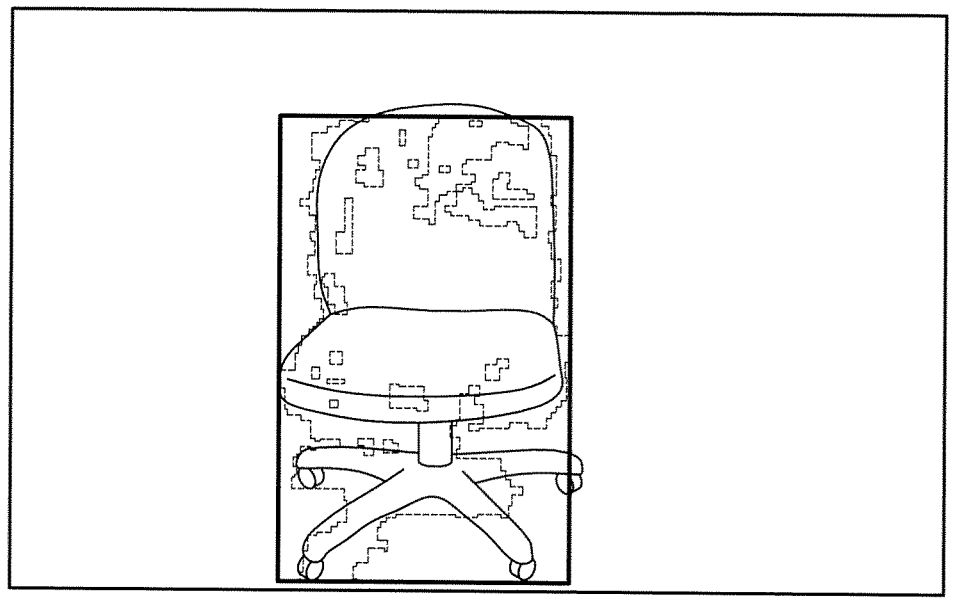
FIG. 9B is a schematic diagram illustrating an object frame selection result where the ground is removed according to another embodiment of the disclosure.

FIG. 7A is a schematic diagram illustrating an object frame selection result where the ground is not removed according to an embodiment of the disclosure. FIG. 7B is a schematic diagram illustrating an object frame selection result where the ground is removed according to an embodiment of the disclosure. FIG. 8A is a schematic diagram illustrating an object frame selection result where the ground is not removed according to another embodiment of the disclosure. FIG. 8B is a schematic diagram illustrating an object frame selection result where the ground is removed according to another embodiment of the disclosure. FIG. 9A is a schematic diagram illustrating an object frame selection result where the ground is not removed according to another embodiment of the disclosure. FIG. 9B is a schematic diagram illustrating an object frame selection result where the ground is removed according to another embodiment of the disclosure. Here, the installation height $D_{CaptureHeight}$ and the pitch angle $\theta_{PitchAngle}$ as measured of the image capture device 110 are respectively: the installation height $D_{CaptureHeight}$ is 90 cm, and the pitch angle $\theta_{PitchAngle}$ is −15 degrees (angle of view downward by 15 degrees).

The object frame selection results shown in FIG. 7A, FIG. 8A, and FIG. 9A are object detection results obtained when the floor has not been estimated. Since the object frame selection results fail to effectively recognize the difference between the floor and the target objects (e.g., a seated chair, a box, and a chair) corresponding to different geometric shapes through the disparity map, they recognize the floor region (the region framed in broken lines) and the target objects as connected objects. Therefore, when a thick black rectangular frame specifying an object range is eventually provided, the floor is also included, causing the object detection effect to be very undesirable. In FIG. 7B, FIG. 8B, and FIG. 9B, since the floor region is deleted, when the thick black rectangular frame specifying the object range is eventually provided, the target objects can be precisely frame selected.

In FIG. 7B, FIG. 8B, and FIG. 9B, after the installation height $D_{CaptureHeight}$ and the pitch angle $\theta_{PitchAngle}$ of the installed image capture device 110 (e.g., a video camera) are obtained, the floor region can be estimated and removed by using these two parameters along with internal parameters of the image capture device 110 itself (including the capture focal length F, the resolution of the captured image, and the baseline distance $D_{BaseLine}$). In other words, an object detecting system that is not subject to interference of the floor is obtained through the foregoing embodiment.

In addition, the foregoing method may be implemented through a non-transitory computer readable storage medium. The computer readable storage medium records at least one program command, and the at least one program command is configured to execute steps S205 to S215 after being loaded to an electronic device.

In summary of the above, the embodiments of the disclosure apply to a system of stereo vision images and are configured to define the floor region and remove the floor region from the image to facilitate subsequent calculation for separating objects. In the foregoing embodiments, with the internal parameters of the image capture device itself (including the capture focal length, the resolution, and the baseline distance), the ground model is estimated by further obtaining two external parameters, i.e., the installation height and the pitch angle of the image capture device, which reduces the difficulty in image processing and enhances the precision in recognizing the target object.

Although the disclosure is disclosed as the embodiments above, the embodiments are not meant to limit the disclosure. Any person skilled in the art may make slight modifications and variations without departing from the spirit and scope of the disclosure. Therefore, the protection scope of the disclosure shall be defined by the claims attached below.

What is claimed is:

1. An image processing method for recognizing a target object, comprising:
   obtaining an original disparity image through an image capture circuit device;
   obtaining a background correlation line in a mapping disparity map according to a background region corresponding to a target object; and
   deleting the background region in the original disparity image based on the background correlation line to recognize the target object, wherein the step of obtaining the background correlation line in the mapping disparity map according to the background region corresponding to the target object further comprises:
finding the background correlation line in the mapping disparity map,
wherein the step of deleting the background region in the original disparity image based on the background correlation line comprises:
obtaining an estimated background disparity map based on the background correlation line; and
comparing the estimated background disparity map and the original disparity image, and deleting the background region in the original disparity image.

2. The image processing method according to claim 1, wherein the step of finding the background correlation line in the mapping disparity map comprises:
calculating an included angle between a field of view of a lens of the image capture circuit and a ground;
calculating a nearest floor distance based on the included angle and an installation height of the image capture circuit;
calculating a vanishing point position in the mapping disparity map based on a capture focal length of the image capture circuit device and a pitch angle for the image capture circuit to capture images;
calculating a nearest floor disparity value based on the capture focal length, a baseline distance, and the nearest floor distance of the image capture circuit; and
obtaining a ground correlation line in the mapping disparity map based on the vanishing point position and the nearest floor disparity value, wherein the ground correlation line is the background correlation line.

3. The image processing method according to claim 2, wherein before the step of calculating the included angle between the field of view of the lens of the image capture circuit and the ground, the image processing method further comprises:
calculating the field of view of the lens based on an image height and the capture focal length of the image capture circuit,
wherein the field of view of the lens is calculated according to a formula below:

$$FOV = 2 \times \arctan[(D_{ImageHeight}/2)/F],$$

wherein FOV is the field of view of the lens, $D_{ImageHeight}$ is the image height, and F is the capture focal length.

4. The image processing method according to claim 3, wherein the included angle between the field of view of the lens of the image capture circuit and the ground is calculated according to a formula below:

$$\theta = FOV/2 + \theta_{PitchAngle},$$

wherein θ is the included angle between the field of view of the lens and the ground, and $\theta_{PitchAngle}$ is the pitch angle.

5. The image processing method according to claim 4, wherein the nearest floor distance is calculated according to a foimula below:

$$D_{NearestPlane} = D_{CaptureHeight}/\sin(\theta),$$

wherein $D_{NearestPlane}$ is the nearest floor distance, and $D_{CaptureHeight}$ is the installation height.

6. The image processing method according to claim 5, wherein the nearest floor disparity value is calculated according to a formula below:

$$V_{NearestDisparity} = D_{BaseLine} \times F/D_{NearestPlane},$$

wherein $V_{NearestDisparity}$ is the nearest floor disparity value, and $D_{BaseLine}$ is the baseline distance.

7. The image processing method according to claim 4, wherein the vanishing point position in the mapping disparity map is calculated according to a formula below:

$$P_{Vanish} = F \times \tan(\theta_{PitchAngle}) + V_{Capturer},$$

wherein $P_{Vanish}$ is the vanishing point position in the mapping disparity map, and $V_{Capturer}$ is a vanishing point position in the case where the image capture circuit is in a horizontal state.

8. The image processing method according to claim 1, wherein the step of obtaining the estimated background disparity map based on the background correlation line comprises:
projecting the background correlation line to UV coordinates to obtain the estimated background disparity map.

9. The image processing method according to claim 1, wherein the step of comparing the estimated background disparity map and the original disparity image and deleting the background region in the original disparity image comprises:
comparing each pixel of the original disparity image and each pixel of the estimated background disparity map one by one, and determining whether a disparity value of the original disparity image is greater than a disparity value of the estimated background disparity map;
determining the pixels of which the disparity value of the original disparity image is smaller than or equal to the disparity value of the estimated background disparity map as the background region; and
deleting the background region in the original disparity image.

10. The image processing method according to claim 1, wherein the mapping disparity map is a V-disparity map or a U-disparity map, and the background region is a floor region.

11. The image processing method according to claim 1, wherein the image capture circuit comprises two lenses.

12. An image processing device comprising:
an image capture circuit, configured to obtain an original disparity image;
a storage circuit, configured to store a plurality of modules; and
a processor coupled to the image capture circuit and the storage circuit, wherein the processor is configured to receive the original disparity image and execute the plurality of modules to implement a plurality of operations, the operations comprising: obtaining a background correlation line in a mapping disparity map according to a background region corresponding to a target object; and deleting the background region in the original disparity image based on the background correlation line to recognize the target object,
wherein the operations implemented by the modules executed by the processor further comprise:
finding the background correlation line in the mapping disparity map; obtaining an estimated background disparity map based on the background correlation line; and comparing the estimated background disparity map and the original disparity image, and deleting the background region in the original disparity image.

13. The image processing device according to claim 12, wherein the operations implemented by the modules executed by the processor further comprise:
calculating an included angle between a field of view of a lens of the image capture circuit and a ground;

calculating a nearest floor distance based on the included angle and an installation height of the image capture circuit; calculating a vanishing point position in the mapping disparity map based on a capture focal length of the image capture circuit and a pitch angle for the image capture circuit to capture images; calculating a nearest floor disparity value based on the capture focal length, a baseline distance, and the nearest floor distance of the image capture circuit; and obtaining a ground correlation line in the mapping disparity map based on the vanishing point position and the nearest floor disparity value, wherein the ground correlation line is the background correlation line.

14. The image processing device according to claim 13, wherein the operations implemented by the modules executed by the processor further comprise:
  calculating the field of view of the lens based on an image height and the capture focal length of the image capture circuit.

15. The image processing device according to claim 12, wherein the operations implemented by the modules executed by the processor further comprise:
  projecting the background correlation line to UV coordinates to obtain the estimated background disparity map.

16. The image processing device according to claim 12, wherein the operations implemented by the modules executed by the processor further comprise:
  comparing each pixel of the original disparity image and each pixel of the estimated background disparity map one by one, and determining whether a disparity value of the original disparity image is greater than a disparity value of the estimated background disparity map; determining the pixels of which the disparity value of the original disparity image is smaller than or equal to the disparity value of the estimated background disparity map as the background region; and deleting the background region in the original disparity image.

17. The image processing device according to claim 12, wherein the mapping disparity map is a V-disparity map or a U-disparity map, and the background region is a floor region.

18. A non-transitory computer readable storage medium, recording at least one program command, wherein the at least one program command executes an image processing method for recognizing a target object after the at least one program command is loaded into and executed by an electronic device, and the method comprising:
  obtaining an original disparity image through an image capture circuit;
  obtaining a background correlation line in a mapping disparity map according to a background region corresponding to a target object; and
  deleting the background region in the original disparity image based on the background correlation line to recognize the target object,
  wherein the step of obtaining the background correlation line in the mapping disparity map according to the background region corresponding to the target object further comprises:
    finding the background correlation line in the mapping disparity map,
  wherein the step of deleting the background region in the original disparity image based on the background correlation line comprises:
    obtaining an estimated background disparity map based on the background correlation line; and
    comparing the estimated background disparity map and the original disparity image, and deleting the background region in the original disparity image.

* * * * *